United States Patent [19]

Orcutt et al.

[11] Patent Number: 5,303,962
[45] Date of Patent: Apr. 19, 1994

[54] CRIMPED HOSE COUPLING FOR REINFORCED HOSES

[75] Inventors: Eric D. Orcutt, Rockvale; Steven R. Hoff, Franklin, both of Tenn.

[73] Assignee: Dana Corporation, Toledo, Ohio

[21] Appl. No.: 47,082

[22] Filed: Apr. 16, 1993

[51] Int. Cl.$^5$ ............................................. F16L 33/207
[52] U.S. Cl. ..................................... 285/259; 285/256
[58] Field of Search ............................. 285/256, 259

[56] References Cited

U.S. PATENT DOCUMENTS

| | | | |
|---|---|---|---|
| 1,952,416 | 3/1934 | Brunner | 285/259 |
| 1,977,917 | 10/1934 | Norgren . | |
| 2,031,823 | 2/1936 | Eastman | 285/256 |
| 2,171,945 | 9/1939 | Norgren . | |
| 2,880,020 | 3/1959 | Audette . | |
| 3,177,016 | 4/1965 | Holmgren | 285/259 |
| 3,249,371 | 5/1966 | Peterman | 285/259 |
| 3,885,819 | 5/1975 | Egerer et al. . | |
| 4,106,526 | 8/1978 | Szentminaly | 285/256 |
| 4,366,841 | 1/1983 | Currie et al. . | |
| 4,400,021 | 8/1983 | Duffield | 285/259 |
| 4,664,424 | 5/1987 | Smith | 285/256 |
| 4,684,157 | 8/1987 | Smith . | |
| 5,190,323 | 3/1993 | Oetiker | 285/256 |

FOREIGN PATENT DOCUMENTS

| | | | |
|---|---|---|---|
| 402484 | 9/1967 | Australia | 285/256 |
| 1215453 | 4/1966 | Fed. Rep. of Germany | 285/256 |
| 1220968 | 1/1971 | United Kingdom | 285/256 |

Primary Examiner—Eric K. Nicholson
Attorney, Agent, or Firm—Millen, White, Zelano & Branigan

[57] ABSTRACT

A hose coupling includes a collar for crimping about a reinforced hose, which collar includes an inner surface having a plurality of inwardly extending annular barbs formed thereon. Each of the barbs has leading and trailing side surfaces which are oriented at equal angles on opposite sides of a normal plane extending therethrough in a direction normal to the axis of the collar. Each annular barb has an edge surface which is flat and extends perpendicular to the normal plane and each of the side surfaces smoothly joined with the inner surface of the cylindrical body with a selected radius of curvature. The radius of curvature of the leading surface is smaller than the radius of curvature of the trailing surface. By providing equal angles of convergence for the leading and trailing surfaces and unequal radii of curvature of the curves which the leading and trailing surfaces join the inner surface of the collar, a consistent and reliable joint with the reinforced hose is provided.

7 Claims, 2 Drawing Sheets

CRIMPED HOSE COUPLING FOR REINFORCED HOSES

FIELD OF THE INVENTION

The instant invention relates to crimped hose fittings for reinforced hoses. More particularly, the instant invention relates to hose fittings which are crimped onto hoses having inner and outer layers of rubber-like material and at least one intermediate layer of reinforcement, which reinforcement may be wire.

BACKGROUND ART

In the past, permanent hose fittings have been mounted in a number of ways such as skiving the outer cover of a reinforced hose. In another approach, hose fittings are provided with sockets which thread over the cover of the hose with the threads cutting through the outer layer of the hose and directly engaging wire in reinforcement. An insert is later added to mate with an adjoining socket.

Both skiving and threadable engagement have disadvantages in that they remove or unnecessarily disturb the outer covering of the hose and are not necessarily easily adapted to simple, inexpensive and rapid manufacturing techniques or, for that matter, field attachment of permanent hose fittings.

In view of these considerations, hose fittings have been used for a number of years, wherein barbs are employed on the inner surface of hose gripping collars. These arrangements are not without difficulty. Sharply pointed barbs having a sturdy base have been used, but these barbs tend to move radially into the reinforcement upon crimping without deflecting either the reinforcement or barbs. Other barbs are configured for engaging the reinforcement but the barbs tend to deform in an uncontrolled manner upon crimping and thus result in hose fittings of varying quality.

In order to avoid the aforementioned drawbacks, the prior art includes fittings in which annular projections are provided with various geometries in order to accomplish adequate couplings. For example, the prior art includes fittings which have annular projections which bend in a controlled fashion; projections which are angled with respect to the inner surface of the sleeve from which they depend, and projections of various sizes and shapes.

SUMMARY OF THE INVENTION

It is a feature of the instant invention to provide a new and improved structure for a hose coupling collar for crimping on a reinforced hose, wherein the collar includes annular barbs which cut through the outer layer of the hose in a manner that is consistent and reliable.

In view this feature and other features, the instant invention contemplates a collar for a hose coupling wherein the collar formed from a cylindrical body including an inner surface having a plurality of inwardly extending, annular barbs formed thereon. Each annular barb is generally trapezoidal in shape and has leading and trailing side surfaces which are oriented at equal angles with respect to a normal plane extending therethrough. Each of the annular barbs includes an inner edge surface which is flat and extends perpendicular to the normal plane. The leading and trailing side surfaces smoothly join the cylindrical body portion with curves having selected radii of curvature. Preferably, the radius of curvature of the leading side surface is smaller than the radius of curvature of the trailing side surface. By combining the equal angles of the side surfaces and the unequal angles of the radii of curvature, a consistent and reliable engagement with the hose results when the collar is crimped.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
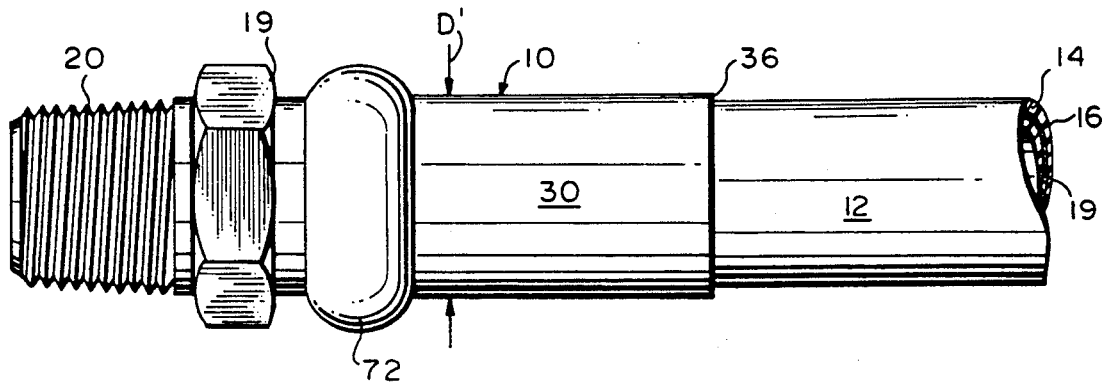
FIG. 1 is a side view showing a hydraulic hose coupling, according to the instant invention, mounted on a wire reinforced hydraulic hose.

Referring now to FIG. 1, there is shown a hydraulic hose coupling, designated generally by the numeral 10, configured in accordance with the principles of the instant invention, mounted on a reinforced hydraulic hose, designated generally by the numeral 12. The reinforced hydraulic hose 12 has a laminate construction with an outer rubber layer 14; an intermediate wire mesh layer 16 providing reinforcement, and an inner rubber layer 18. The hydraulic hose coupling 10 is hollow and has a nipple 19 with a coupling end 20 adapted to threadably or otherwise connect wherein fluid may flow through the hose 12 to whatever device is coupled to the end 20 of the hydraulic hose coupling.

Figure 2:
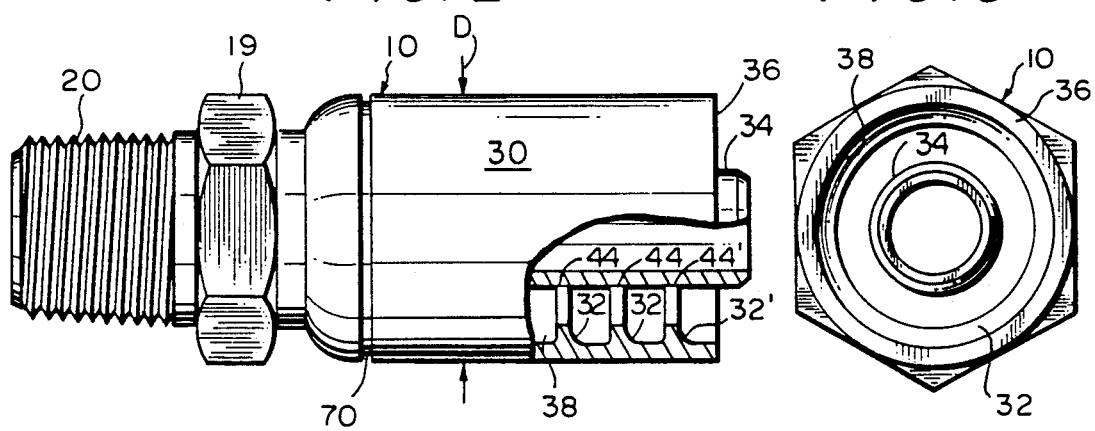
FIG. 2 is a side view, partially in section, of the hydraulic hose coupling of FIG. 1 prior to crimping the hose fitting.
Figure 3:
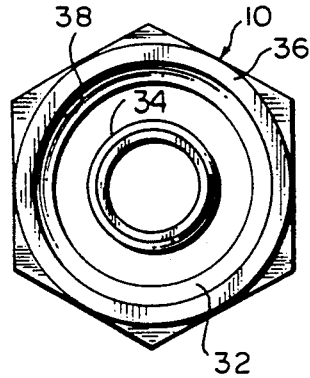
FIG. 3 is an end view taken in the direction of arrows 3—3 of FIG. 2.

Referring now to FIGS. 2 and 3 where the hydraulic hose coupling 10 is shown prior to crimping, it is seen that the coupling includes a collar 30 (see also FIG. 8) which has a pre-crimp state wherein the diameter D of the collar is greater than the diameter D' of the collar after crimping. The collar 30 includes a plurality of axially spaced, annular barbs 3 2, configured in accordance with the principles of the invention, which barbs are radially spaced from a tubular extension 34 of the nipple 19. The hose 12 is received through a rear end 36 of the collar 30 and between the collar and the tubular extension 34. The inner layer 18 of the hose 12 abuts the exterior surface of the tubular extension 34 and the exterior layer 14 of the hose faces the interior wall 38 of the collar.

Figure 4:
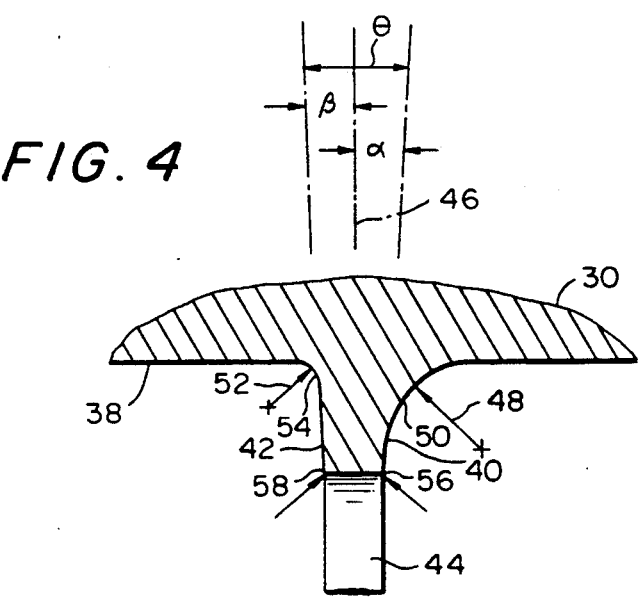
FIG. 4 is an enlarged cross-section of a portion of an annular barb configured in accordance with the instant invention.

Referring now to FIG. 4, where one of the annular barbs 32 is shown enlarged for clarity, it is seen that the barbs are each defined by a trailing surface 40 and a leading surface 42 which converge slightly toward an edge surface 44. In accordance with the principles of the instant invention, the surfaces 40 and 42 converge at an angle $\theta$ of about 6° toward a normal plane including a center line radius 46 with the trailing surface 40 being at an angle $\alpha$ of 3° with respect to the center line radius and the leading surface 42 being at angle $\beta$ of 3°, with respect to the center line radius.

The trailing surface 40 converges toward the inner surface 38 of the collar 30 over a first radius 48 to form a curve 50, while the leading surface 42 converges toward the inner surface of the collar over a second radius 52 to define curve 54. The radius 48 is typically 0.060 of an inch, while the radius 52 is typically 0.015 of an inch.

The trailing surface 40 merges into the flat edge surface 44 by a radius of 0.005 of an inch while the leading surface 42 merges into the edge surface 44 with a radius of 0.005 of an inch.

The collar 30 is made of steel and the annular barbs 32 are machined therein in spaced relation with respect to one another in accordance with the aforedescribed parameters. The machining leaves the inner diameter 38 which engages the outer surface of the outer layer 14 of the hose 12 while the annular barbs 32 penetrate through the outer layer and engage the layer of wire mesh 16.

Figure 5:
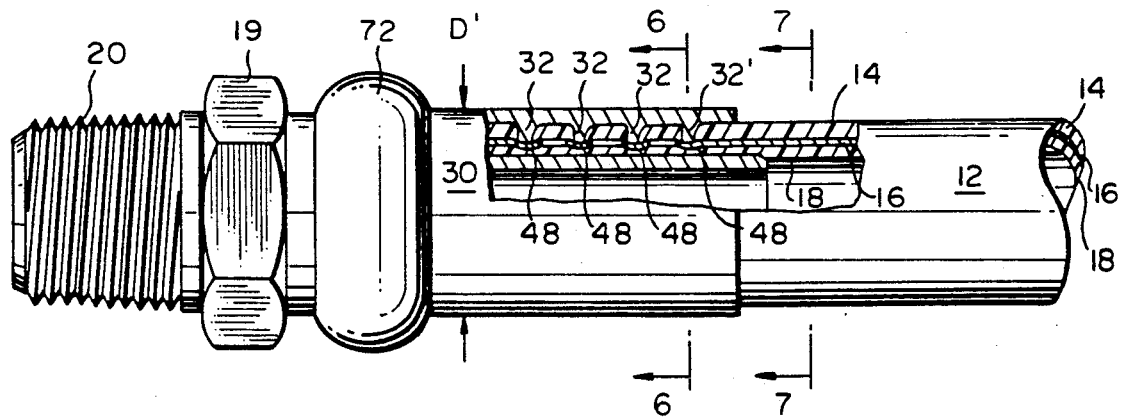
FIG. 5 is a side view, partially in section, showing the hydraulic hose coupling of FIG. 2 after crimping.
Figure 6:
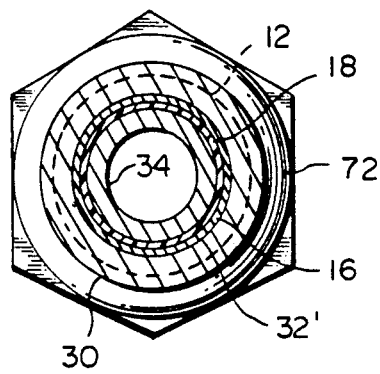
FIG. 6 is an elevation taken along lines 6—6 of FIG. 5.
Figure 7:
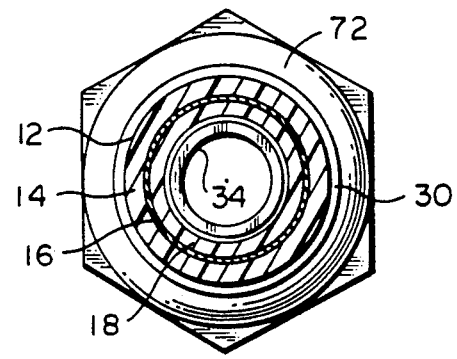
FIG. 7 is an elevation taken along lines 7—7 of FIG. 5.

Referring now to FIGS. 5-7 which show a cylindrical portion 46 of the collar 30 crimped, it is seen that the annular barbs 32 deform the wire mesh layer 16. After penetrating the outer layer 14 of the reinforced hydraulic hose 12, the inner layer 18 is penetrated by deformations 48 formed in the wire layer 16. Penetration of the inner layer of the hose 12 does not extend all the way through to the outer surface of the tubular extension 34 of the nipple 19. Consequently, the inner layer 18 maintains a tight seal with the nipple 34, while the outer layer 14 is sealed tightly against the inner surface 38 of the collar 30 due to pressure applied by the crimp over the cylindrical crimping portion 46 of the collar. The hose 12 is therefore permanently retained to the end fitting 10 by the crimped portion 46 of the collar 30.

By providing the annular barbs 32 with a flat inner edge surface 44 and with rounded corners 56 and 58, the layer of wire mesh 16 is deformed, rather than being ripped or torn. By tapering the trailing surface 40 and leading surface 42 of the annular barbs 32 by the slight angle $\theta$ of 6° and by having the curves 50 and 54 of unequal radii, the coupling is consistent and reliable in that fitting compression is easier to control during the crimping operation. The taper is sufficient so that the surface 44 cuts through the outer rubber layer 14 of the hose 12, while the area 44 is sufficiently wide so as to provide a frictional and mechanical grip with the layer of wire reinforcement 16 to ensure a permanent connection between the hose fitting 10 and the hose 12.

Figure 8:
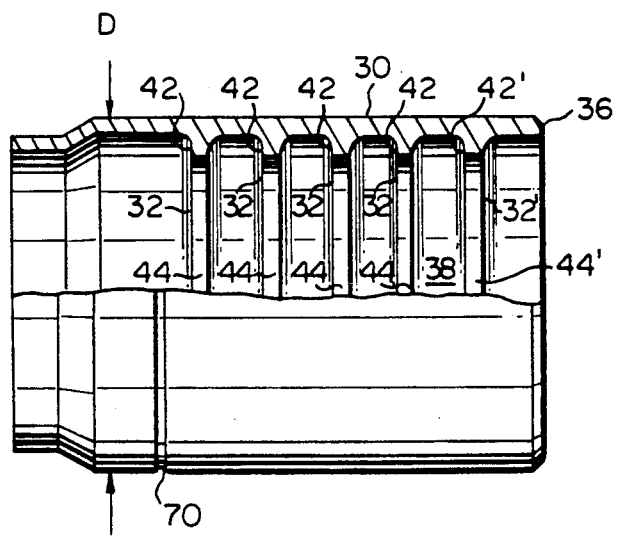
FIG. 8 is an elevational view of a crimping collar having the features of the instant invention prior to mounting the crimping collar on a nipple to form the hydraulic hose coupling of FIGS. 1–7.

Referring now to FIG. 8, there is shown a typical embodiment of a shell used to form the collar 30. The shell is formed of 12 L-14 tubular steel which is 1⅛ inch in diameter and is annealed to a hardness of Rb55/60 and then zinc plated and dipped in chromate. The collar has an outer diameter in the range of 1.123 to 1.129 inches and an inner diameter as measured with respect to the surface 38 of about 1.032 to about 1.038 inches. Preferably, the first annular barb 32' has a height slightly less than the height of the subsequent barbs 32 which are of identical heights and shapes. Typically, the inboard barbs 32 are four in number and have an inner diameter as measured with respect to the edge surfaces 44 in the range of 0.904 to 0.907, while the barbs 32' have an inner diameter in the range of about 0.884 to about 0.887 inch. The width of the inner edge surfaces 44 of each barb is in the range of 0.033 inches to 0.038 inches. For a collar shell 30 having a length of about 1.550 inches, the trailing surfaces 42' of the barb 32' is spaced 0.225 inch from the rear end 36 of the collar 30 while the trailing surfaces of remaining four annular barbs 32 are spaced 0.0625, 0.825, 1.025 and 1.550 inches from the rear end of the collar.

The collar 30 is provided with a crimp location mark 70. As is seen in FIG. 5, when the crimp takes place, the shell forming the collar 30 is crimped down over area 46 in front of the mark 70 and forms a convex ring 72 beyond the crimp location mark.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A hose coupling collar formed about an axis and having a first end through which a reinforced hose is inserted and a second end to which a nipple is attached, the collar being adapted to be crimped about a reinforced hose, wherein the reinforced hose has an outer layer of resilient material and an inner layer of resilient material with reinforcing material disposed therebetween and wherein the hose coupling collar includes a plurality of separate, non-spiral annular barbs for penetrating the outer layer and engaging the reinforcing layer upon crimping the hose coupling collar to urge the reinforced hose against a tubular extension of a nipple within the hose, the improvement comprising: for each barb a leading surface and a trailing surface joined by an edge surface, wherein the edge surface joins the leading and trailing surfaces and penetrates the outer layer of the hose, the leading surface and trailing surface converging toward one another and being joined to a cylindrical inner surface of the collar by cures of unequal radii and the reinforcing material being in the form of a non-spiral, steel mesh.

2. The improvement of claim 1, wherein the radius of the curve joining the leading surface to the inner surface of the cylindrical column is greater than the radius of the curve joining the trailing surface of the cylindrical collar to the inner cylindrical surface of the coupling collar.

3. The improvement of claim 1, wherein the leading and trailing surface converge at equal angles with respect to a plane extending through each barb, which plane is perpendicular to the axis of the coupling collar.

4. The improvement of claim 3, wherein the barb closest to the second end of the coupling collar has a height less than the other barbs.

5. The improvement of claim 4, wherein the leading surface and trailing surface each join the edge surface with a radius of curvature substantially less than the radius of curvature of the leading and trailing curves.

6. The improvement of claim 1, wherein the hose coupling collar has an uncrimped diameter in the range of about 1.123 to about 1.129 inches, wherein the annular barbs have a height in a range of about 0.15 inches with the edge surface having a width of about 0.035 inches, the leading curve having a radius of about 0.015 inch and the trailing curve having a radius of about 0.060 inch.

7. The improvement of claim 6, wherein the leading and trailing surfaces of each barb each converge toward one another at an angle of 3° with respect to a radial plane perpendicular to the axis of the collar.

* * * * *

UNITED STATES PATENT AND TRADEMARK OFFICE
CERTIFICATE OF CORRECTION

PATENT NO. : 5,303,962
DATED : April 19, 1994
INVENTOR(S) : Eric D. ORCUTT et al.

It is certified that error appears in the above-indentified patent and that said Letters Patent is hereby corrected as shown below:

Claim 1; Column 4; Line 46:

Change "cures" to read . . .

- - curves - -

Signed and Sealed this

Twenty-third Day of August, 1994

Attest:

BRUCE LEHMAN

*Attesting Officer*   *Commissioner of Patents and Trademarks*